(12) United States Patent
Amoah et al.

(10) Patent No.: US 10,605,992 B2
(45) Date of Patent: Mar. 31, 2020

(54) BACKSIDE BINARY GRATED LENS COUPLED TO FRONT SIDE WAVEGUIDE

(71) Applicant: INTERNATIONAL BUSINESS MACHINES CORPORATION, Armonk, NY (US)

(72) Inventors: Yoba Amoah, Fairfax, VT (US); Brennan J. Brown, Burlington, VT (US); John J. Ellis-Monaghan, Grand Isle, VT (US); Ashleigh R. Kreider, Richmond, VT (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 15/798,581

(22) Filed: Oct. 31, 2017

(65) Prior Publication Data

US 2018/0067264 A1  Mar. 8, 2018

Related U.S. Application Data

(63) Continuation of application No. 15/439,070, filed on Feb. 22, 2017, now Pat. No. 9,910,223, which is a
(Continued)

(51) Int. Cl.
  *G02B 6/34* (2006.01)
  *G02B 6/26* (2006.01)
  (Continued)

(52) U.S. Cl.
  CPC .......... *G02B 6/32* (2013.01); *G02B 6/29304* (2013.01); *G02B 6/30* (2013.01); *G02B 6/34* (2013.01);
  (Continued)

(58) Field of Classification Search
  CPC . G02B 6/34; G02B 6/32; G02B 6/324; G02B 6/352; G02B 6/3524; G02B 6/3526;
  (Continued)

(56) References Cited

U.S. PATENT DOCUMENTS 5,515,198 A    5/1996  Kusuda et al.
5,966,399 A   10/1999  Jiang et al.
(Continued)

FOREIGN PATENT DOCUMENTS

GR    2181567    7/1985
JP    2012084693  4/2012
(Continued)

OTHER PUBLICATIONS

Jose Marques-Hueso et al., Genetic Algorithm Designed Silicon Integrated Photonic Lens Operating at 1550 nm, Applied Physics Letters, Aug. 2010, vol. 97, Issue 7, 4 pages.
(Continued)

*Primary Examiner* — Kaveh C Kianni
*Assistant Examiner* — Hung Q Lam
(74) *Attorney, Agent, or Firm* — Steven Meyers; Andrew M. Calderon; Roberts Mlotkowski Safran Cole & Calderon, P.C.

(57) ABSTRACT

A wafer structure includes a diffractive lens disposed on a backside of a wafer and coupled to a front side waveguide, the diffractive lens being configured to receive light and focus the light to the front side waveguide.

13 Claims, 7 Drawing Sheets

Related U.S. Application Data continuation of application No. 14/788,179, filed on Jun. 30, 2015, now Pat. No. 9,690,051.

(51) Int. Cl.

| | | |
|---|---|---|
| *G02B 6/32* | (2006.01) | |
| *G02B 6/42* | (2006.01) | |
| *G02B 6/10* | (2006.01) | |
| *G02B 6/293* | (2006.01) | |
| *G02B 6/30* | (2006.01) | |
| *G02B 6/35* | (2006.01) | |

(52) U.S. Cl.
CPC ............ *G02B 6/4206* (2013.01); *G02B 6/305* (2013.01); *G02B 6/352* (2013.01)

(58) Field of Classification Search
CPC ............ G02B 6/29304; G02B 6/29308; G02B 6/29311; G02B 6/29323
USPC ............ 385/14, 15, 33, 37, 39, 49, 129–132
See application file for complete search history.

(56) References Cited

U.S. PATENT DOCUMENTS

| | | |
|---|---|---|
| 7,149,385 B2 | 12/2006 | Parikka et al. |
| 7,162,124 B1 | 1/2007 | Gunn et al. |
| 7,303,339 B2 | 12/2007 | Zhou et al. |
| 8,064,745 B2 | 11/2011 | Fortusini et al. |
| 8,231,284 B2 | 7/2012 | Doany et al. |
| 8,304,850 B2 | 11/2012 | Lazarov et al. |
| 8,687,294 B2 | 4/2014 | Kintz et al. |
| 8,755,644 B2 | 6/2014 | Budd et al. |
| 9,690,051 B2 | 6/2017 | Amoah et al. |
| 9,746,608 B1* | 8/2017 | Rabiei ............... G02B 6/124 |
| 2008/0106527 A1* | 5/2008 | Cornish ............. G02B 6/12004 345/176 |
| 2008/0304054 A1 | 12/2008 | Goosens et al. |
| 2011/0142395 A1* | 6/2011 | Fortusini ............ G02B 6/34 385/37 |
| 2011/0147869 A1 | 6/2011 | Lazarov et al. |
| 2011/0278441 A1 | 11/2011 | Vermeulen et al. |
| 2013/0182998 A1 | 7/2013 | Andry et al. |
| 2013/0224896 A1 | 8/2013 | Ellis-Monaghan et al. |
| 2013/0230280 A1* | 9/2013 | Kadar-Kallen ...... G02B 6/4204 385/33 |
| 2017/0003452 A1 | 1/2017 | Amoah et al. |
| 2017/0160483 A1 | 6/2017 | Amoah et al. |

FOREIGN PATENT DOCUMENTS

| | | |
|---|---|---|
| JP | 2013201156 | 10/2013 |
| WO | 8700297 | 1/1987 |

OTHER PUBLICATIONS

Gaylord et al., "Analysis and applications of optical diffraction by gratings", Proceedings of the IEEE, May 1985, vol. 73, Issue 5 pp. 894-937.

Pawlowski, "Thin film deposition: an alternative technique for the fabrication of binary optics with high efficiency," Holographic Systems, Components and Applications, Sep. 1993, Fourth International Conference, 6 pages.

List of IBM Patents or Patent Applications Treated as Related 1 page.

List of IBM Patents or Patent Applications Treated as Related, dated Jan. 15, 2020, 1 page.

* cited by examiner

BACKSIDE BINARY GRATED LENS COUPLED TO FRONT SIDE WAVEGUIDE

FIELD OF THE INVENTION

The invention relates to semiconductor structures and, more particularly, to an integrated circuit with a backside binary grated lens coupled to a front side waveguide and a method of manufacture.

BACKGROUND

Transmitting light from a light source, such as a laser, across a semiconductor structure, such as an integrated circuit, can be difficult to achieve. For example, sophisticated alignment packaging schemes needed to align the integrated circuit to an optical fiber. This alignment needs to be accurate to the submicron level, which can be very costly. Also, the diameter of fiber, and a beam of light output by the fiber, can be substantially larger, e.g., by a factor of 200, than the diameter of a waveguide. Because of this large difference in diameter, substantial optical loss often occurs when coupling the fiber to the waveguide.

SUMMARY

In an aspect of the invention, a wafer structure comprises a diffractive lens disposed on a backside of a wafer and coupled to a front side waveguide, the diffractive lens being configured to receive light and focus the light to the front side waveguide.

In an aspect of the invention, a structure comprises a lens structure on a first side of a wafer. The lens structure comprises an oxide material with a plurality of trenches of a predefined pattern filled with a material with a different index of refraction as the oxide material. The structure comprises a coupler provided on a second side of the wafer and aligned with light provided from the lens; and a waveguide coupled to the coupler.

In an aspect of the invention, a method comprises providing a diffractive lens on a backside of a wafer; and connecting a waveguide to a front side of the wafer, wherein the diffractive lens configured to receive light and focus the light to the waveguide connected to the front side of the wafer.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
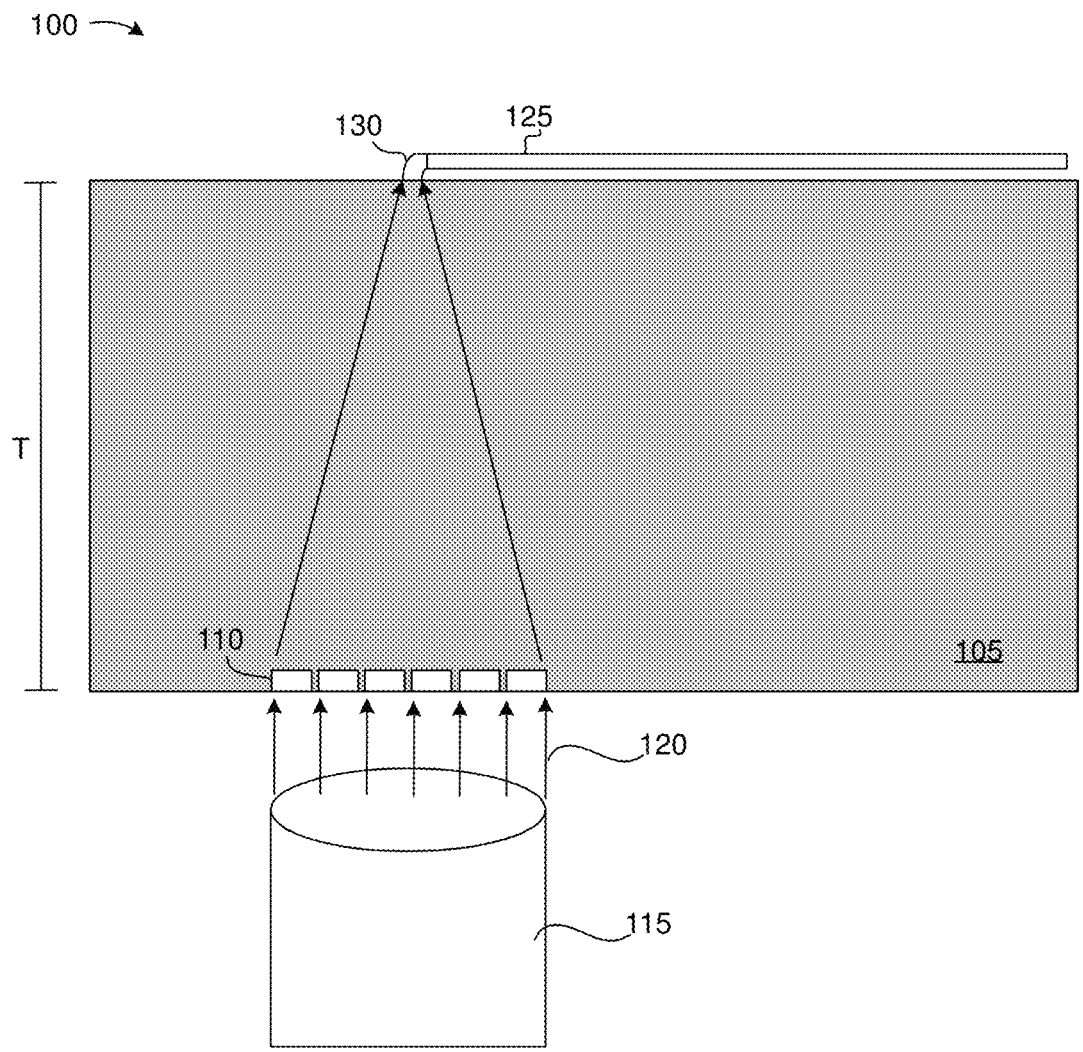
FIG. 1 shows an overview of an example wafer with a backside lens in accordance with aspects of the present invention.

The invention relates to semiconductor structures and, more particularly, to an integrated circuit with a backside binary grated lens and a method of manufacture. More specifically, the present invention relates to an integrated circuit with a lens on a backside of a substrate or wafer to focus a relatively large diameter light beam to a relatively small diameter waveguide provided on a topside of the substrate.

In accordance with aspects of the present invention, a lens is built on a backside of a substrate, e.g., a wafer of an integrated circuit, to focus a beam of light from a fiber to a waveguide that has a substantially smaller diameter than the beam of light, e.g., 30 to 200 times smaller diameter. In embodiments, the lens may be a grated binary diffractive lens that takes advantage of the thickness of the wafer to focus the light from the fiber to the waveguide without substantial changes in the direction of the light. Practically, binary optical grating design can be performed using computer aided simulations as is known to those of skill in the art. As a result of the design of the present invention, the waveguide may receive the light, and since the light has been focused to the waveguide with high efficiency, optical loss is minimized. Also, light from a single fiber and having multiple different wavelengths, e.g., in wavelength division multiplexing (WDM) systems, can also be focused to the waveguide with minimized optical loss.

In accordance with aspects of the present invention, a backside binary grated lens is provided and coupled to a topside silicon waveguide through a vertical to horizontal coupler structure. In embodiments, the vertical to horizontal coupling may be a polysilicon spacer to a horizontal single crystal silicon waveguide. In embodiments, the height of the coupler may match the height of the waveguide. In embodiments, the polysilicon spacer can be about 0.1 micrometers to about 3 micrometers thick, and preferably about 1 micrometer thick. In embodiments, the binary grated lens may be a sequence of etched trenches in the backside of the wafer and filled with nitride, oxide, and/or other materials.

The integrated circuit in accordance with aspects of the present invention can be fabricated using conventional fabrication processes. For example, the integrated circuit of the present invention can be manufactured in a number of ways using a number of different tools. In general, though, the methodologies and tools are used to form structures with dimensions in the micrometer and nanometer scale. The methodologies, i.e., technologies, employed to manufacture the organic probe substrate of the present invention have been adopted from integrated circuit (IC) and printed circuit board technology. For example, the structures of the present invention are realized in films of material patterned by photolithographic processes. In particular, the fabrication of the integrated circuit of the present invention uses three basic building blocks: (i) deposition of thin films of material on a substrate, (ii) applying a patterned mask on top of the films by photolithographic imaging, and (iii) etching the films selectively to the mask.

FIG. 1 shows an example wafer with a backside lens in accordance with aspects of the present invention. As shown in FIG. 1, an integrated circuit 100 may include a wafer 105 with a waveguide 125 provided on a topside of the wafer 105. A coupler 130 may connect the waveguide 125 to the wafer 105. The wafer 105 includes a lens 110 integrated on an opposite side of the wafer 105, e.g., a bottom side of the wafer 105 with respect to the waveguide 125 and the coupler 130.

In embodiments, the lens 110 may be a binary diffractive grated lens. In operation, the lens 110 receives light 120 from an optical fiber 115, e.g., from a bottom side of the wafer 105, and focuses the light 120 to the waveguide 125, e.g., via the coupler 130. For example, when the light 120 contacts the lens 110, the direction of the light 120 changes towards the coupler 130. In this way, the lens 110 reduces a width of the light 120 to converge to a smaller width. For example, the lens 110 may focus the light 120 to approximately the width of the coupler 130. In embodiments, the lens 110 will focus the light 120 by a factor of approximately 200. For example, the lens 110 may focus the light 120 from approximately 100 micrometers off center to approximately 0.5 micrometers. As shown in FIG. 1, wafer 100 has a thickness T that is relatively large, thus reducing the angle at which the light 120 changes direction, and hence, minimizing optical loss.

Figure 2:
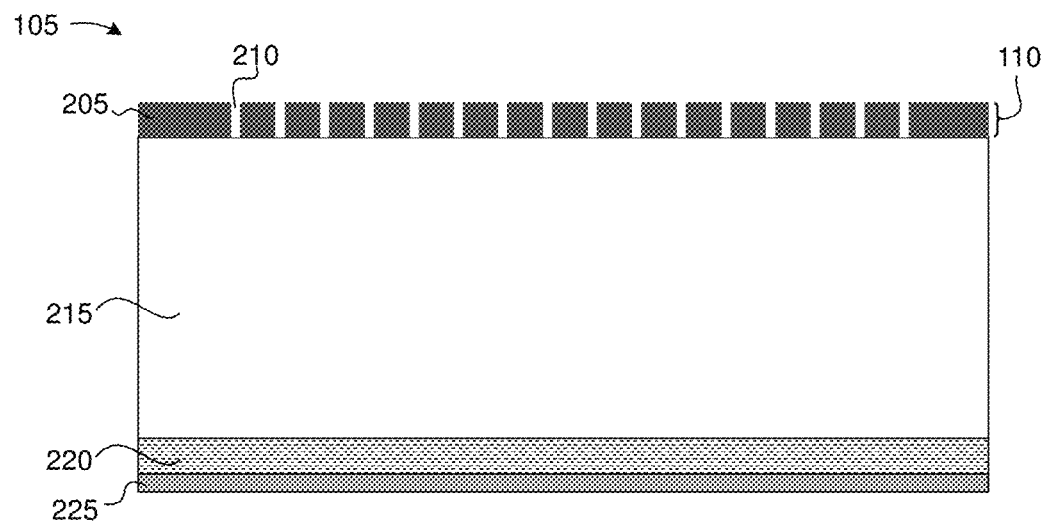
FIGS. 2 and 3 show manufacturing processes and respective structures in accordance with aspects of the present invention.
Figure 3:
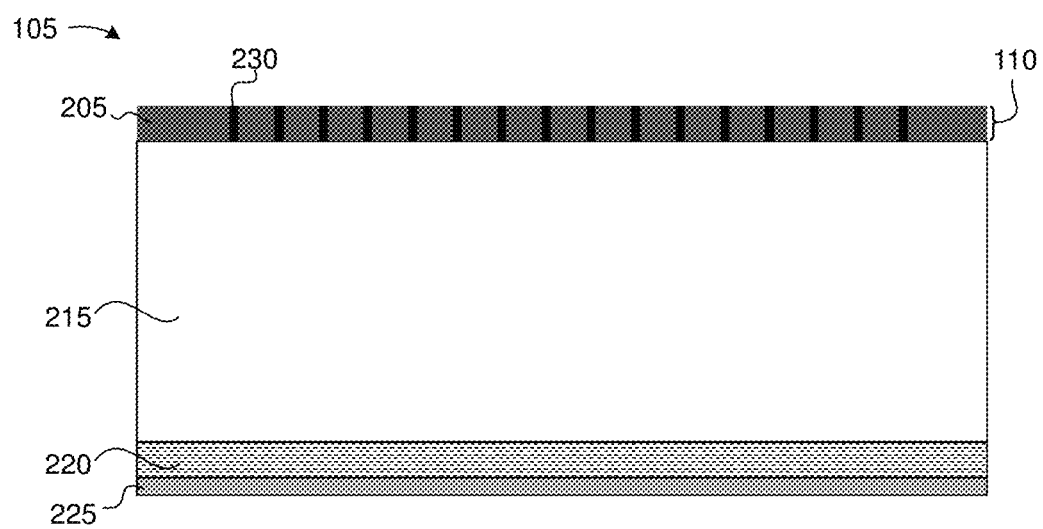

FIGS. 2 and 3 show manufacturing processes and respective structures in accordance with aspects of the present invention. As shown in FIG. 2, the wafer 105 may be a silicon on insulator (SOI) substrate with a silicon layer 225 formed on a buried insulator layer 220. The silicon layer 225 can be any semiconductor layer composed of any suitable material including, but not limited to, Si, SiGe, SiGeC, SiC, Ge alloys, GaAs, InAs, InP, and other III/V or II/VI compound semiconductors where the semiconductors are transparent to light of the wavelengths that the application is using. The buried insulator layer 220 can be a buried oxide material. The buried insulator layer 220 can be formed on a wafer, e.g., silicon 215. In embodiments, the SOI wafer 105 can be formed using conventional processes, such as Separation by Implantation of Oxygen (SIMOX) or other bonding techniques.

The lens 110 can be formed onto the wafer 105, e.g., by depositing an insulator layer 205 on the wafer 215. In embodiments, the insulator layer 205 is preferably an oxide material due to the index of refraction of oxide being substantially lower than the index of refraction of silicon. In this way, it becomes easy to alter the direction of incoming light, e.g., to a focal point, such as an opening of a waveguide or a waveguide coupler, such as a coupler 130 of FIG. 1.

In embodiments, the insulator layer 205 may be deposited using atomic layer deposition (ALD), chemical vapor deposition, plasma-enhanced chemical vapor deposition (PECVD), and/or other conventional deposition processes. Following deposition of the insulator layer 205, the surface of the insulator layer 205 can be planarized using etch back techniques, e.g., chemical mechanical polish (CMP) techniques, and/or other conventional planarization techniques. A photoresist is then applied to the insulator layer 205. The photoresist is then exposed to energy (e.g., light) to form a pattern (openings). Trenches 210 are then etched into the insulator layer 205 through the openings of the photoresist. The photoresist is then removed using conventional strippants, e.g., oxygen ashing.

As shown in FIG. 3, the trenches 210 are then filled with silicon nitride or other insulator material different than the insulator layer 205 to form segments 230. The silicon nitride can then be planarized, thereby completing the construction of the lens 110 on the backside of wafer 105. In embodiments, the insulator layer 205 and the segments 230 together form a binary diffractive grated lens having a diffraction grating that redirects light that contacts the lens 110. In embodiments, the distance between the segments 230, e.g., a grating distance, may differ than what is shown in FIG. 3. For example, the grating distance may be based on the diffraction angle, or the angle in which the direction of incoming light needs to be altered to focus the incoming light to a waveguide. As described herein, the grating distance may vary across the lens 110, and may not necessarily be equal as shown in FIG. 3. While the lens 110 is shown as a binary diffractive grated lens formed with silicon nitride material, in practice, other types of lenses may be used to focus light from a backside of a wafer to a waveguide connected to a front side of the wafer.

Figure 4A:
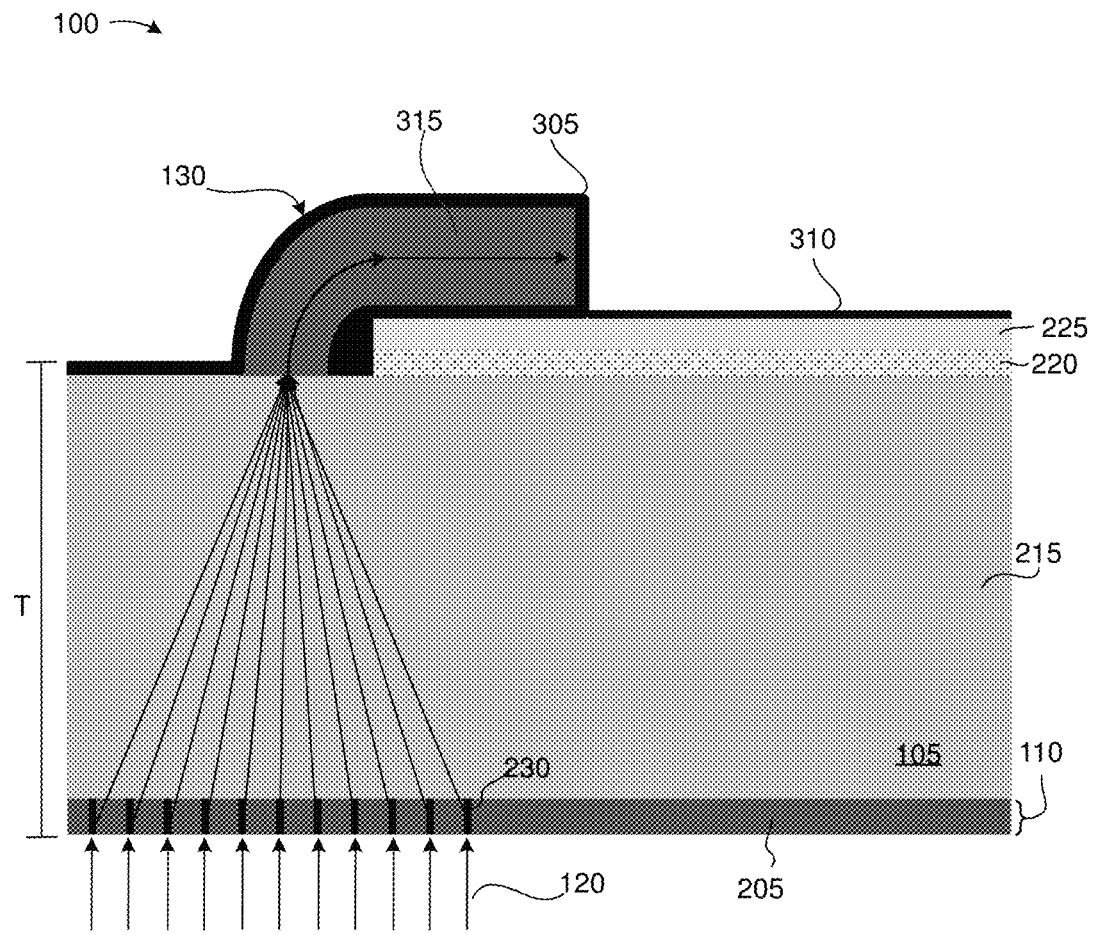
FIG. 4A shows an example wafer with a backside lens in accordance with aspects of the present invention.

FIG. 4A shows an example backside lens in accordance with aspects of the present invention. As shown in FIG. 4A, a coupler 130 is provided on a topside of a wafer 100 in contact with a silicon 215 and an oxide layer 310. In embodiments, the coupler 130 may include polysilicon material 315, covered with an oxide material 305, 310. The oxide material 310 is formed on the silicon layer 225. The lens 110 is provided on an opposite side of the wafer 105, e.g., on a bottom side of the wafer 105 opposite of the coupler 130. The lens 110 is constructed to alter the direction of light 120 to coupler 130, e.g., focus the light 120 from a fiber optic into the coupler 130. In embodiments, the angle of the light 120 can vary depending on its portion contacting the lens, with respect to the directions inversely proportional to the thickness T of the wafer 105. Since the wafer 105 has a substantially large thickness (the distance between when light contacts the lens 110 and the coupler 130), the angle that the light 120 changes directions is minimized and the number of refractive index changes in the path is minimized, thereby minimizing optical loss. In embodiments, the coupler 130 may be integrated with a waveguide, such as the waveguide 125 shown in FIG. 1.

Figure 4B:
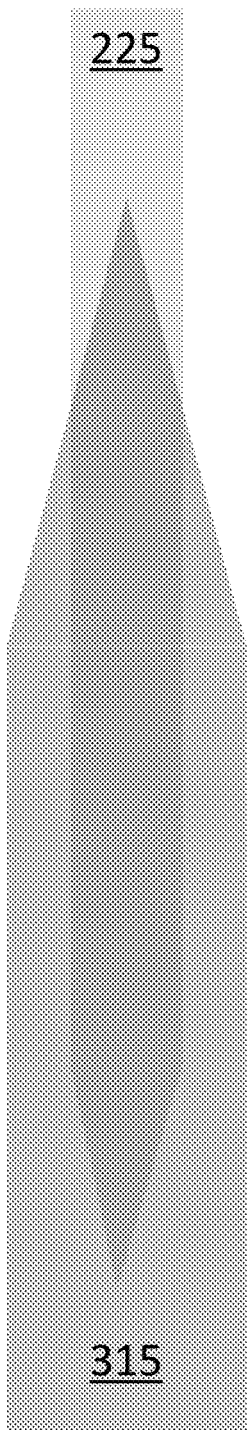
FIG. 4B shows a top down view of the adiabatic coupler in accordance with aspect of the invention.

FIG. 4B shows a topside view of the polysilicon material 315 of the coupler 130 coupling to the waveguide silicon layer 225 in accordance with aspects of the invention. Both the polysilicon material 315 and the waveguide silicon layer 225 have a portion of their length graded from thin to thick (or thick to thin) to aid in adiabatic coupling reducing unwanted reflections at an abrupt material change.

Figure 5:
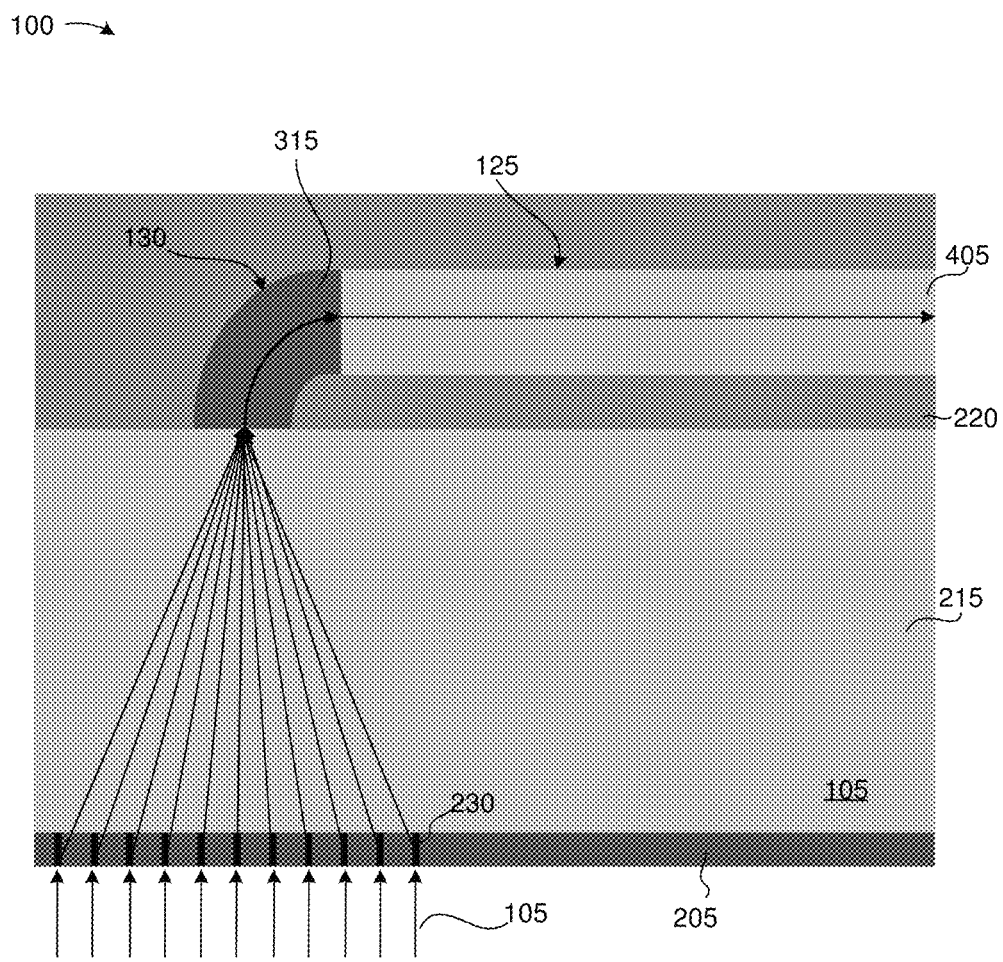
FIG. 5 shows an example wafer with a backside lens in accordance with aspects of the present invention.

FIG. 5 shows another example wafer with a backside lens in accordance with aspects of the present invention. As shown in FIG. 5, a waveguide 125 is coupled to the coupler 130. The waveguide 125 can be formed on the wafer using conventional deposition lithography and etching processes. The waveguide 125 can be a single crystalline silicon material 405. As shown, the coupler 130 receives light 120 focused by the lens 110, and the light 105 entering the coupler 130 is provided to the waveguide 125. In embodiments, the coupler 130 and the waveguide 125 may be integrated. That is, the coupler 130 may be a waveguide that includes the single crystalline silicon material 405.

Figure 6:
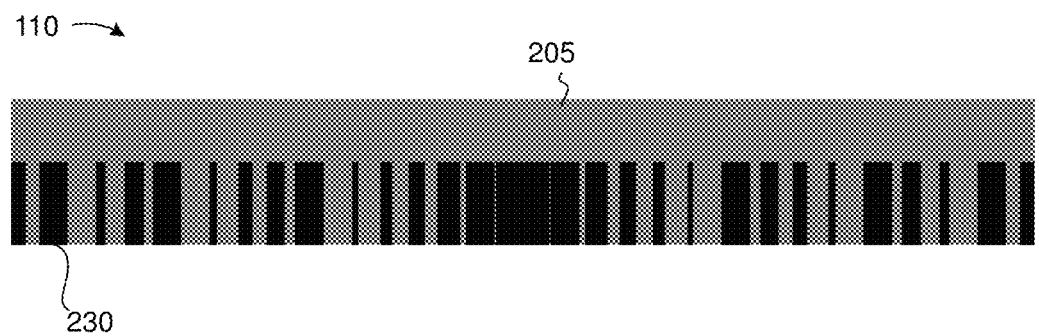
FIG. 6 shows an exemplary pattern of a binary diffractive lens in accordance with aspects of the present invention.

FIG. 6 shows a cross-sectional view of a pattern of an example binary diffractive lens in accordance with aspects of the present invention. As shown in FIG. 6, the width of each segment 230 and the distance between the segments 230 can vary across the lens 110. The width of each segments 230 and the distance between segments 230 is designed with consideration to the required angle of refraction to focus incoming light at each point on the lens 110 to a focal point, e.g., a waveguide. In a middle of the lens 110, the width and distance is such that the angle of refraction for incoming light is minimal, e.g., assuming the focal point is at a middle of the lens 110. For example, a larger angle of refraction for incoming light is provided as the light enters the lens 110 further away from the center.

Figure 7:
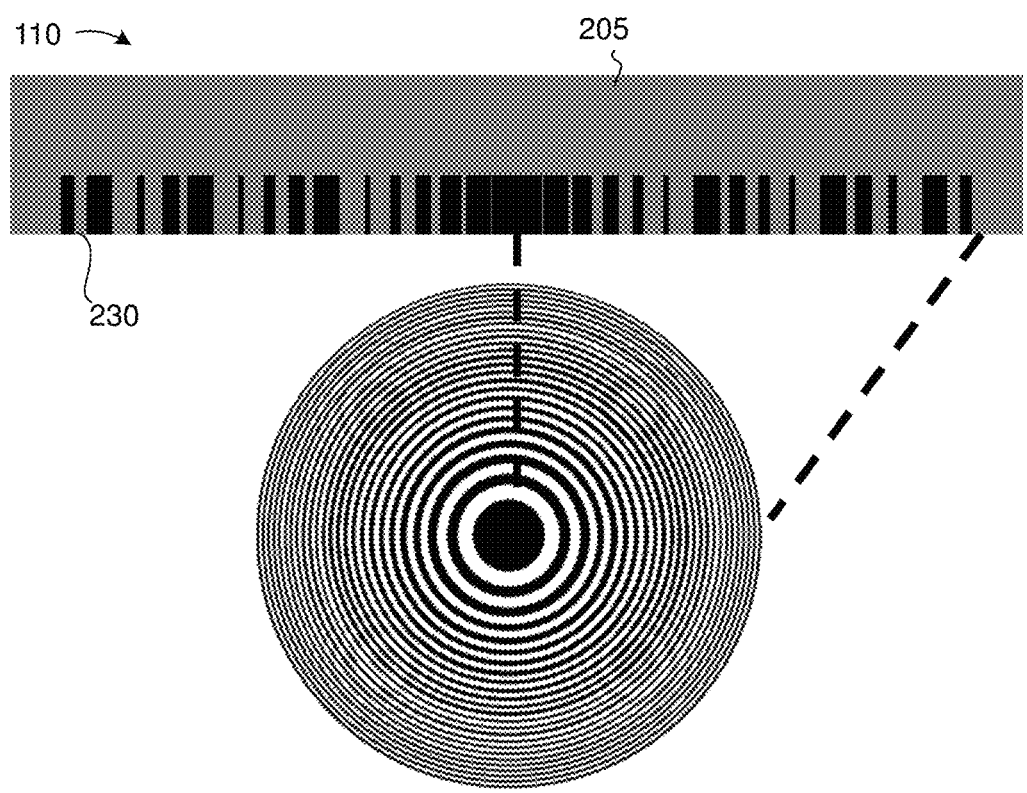
FIG. 7 shows another exemplary pattern of a binary diffractive lens in accordance with aspects of the present invention.

FIG. 7 shows another example of a binary diffractive lens in accordance with aspects of the present invention. As shown in FIG. 7, segments 230 may be arranged as concentric circles when viewed from the top. The arrangement of the segments 230 cause a beam of light within a fiber with a diameter of approximately 100 micrometers to focus to an opening of a waveguide having approximately a 0.5 micrometer diameter.

The method(s) as described above is used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A wafer structure comprising:
a diffractive lens disposed on a backside of a wafer and coupled to a front side waveguide, the diffractive lens being configured to receive light and focus the light to the front side waveguide, wherein the diffractive lens comprises:
an insulator layer comprising trenches that each extend from a first surface of the insulator layer to a second surface of the insulator layer, the second surface of the insulator layer contacting the backside of the wafer; and
segments in the trenches in the insulator layer, wherein each of the segments comprises an insulator material with a surface that is co-planar with the first surface of the insulator layer.

2. The structure of claim 1, wherein the insulator material of the segments is different than an insulator material of the insulator layer.

3. The structure of claim 1, wherein the lens is a binary diffractive lens.

4. The structure of claim 1, further comprising a coupler connecting the front side waveguide to the wafer, wherein the coupler receives the light and transmits the light to the waveguide.

5. The structure of claim 4, wherein the coupler includes a polysilicon material.

6. The structure of claim 4, wherein the coupler is a spacer coupled to the front side waveguide and has a substantially 90-degree curved elbow shape.

7. The structure of claim 6, wherein:
the front side waveguide includes a single crystalline silicon material, and the coupler is thicker than the front side waveguide, wherein the curved elbow shape of the coupler redirects the light approximately 90 degrees from a point from where the light is received by the coupler at a front side of the wafer to a point where the light enters the front side waveguide, and
the coupler includes a polysilicon material.

8. The structure of claim 1, wherein the light is received from an optical fiber.

9. A structure comprising:
a lens structure on a first side of a wafer, the lens structure comprising a material which fills trenches of a predefined pattern and which has a different index of refraction as the material in which the trenches are formed, wherein the material that fills the trenches forms segments, and each of the segments has a first surface that contacts the first side of the wafer and a second surface that is coplanar with a surface of the material in which the trenches are formed;
a coupler provided on a second side of the wafer and aligned with the light provided from the lens structure; and
a waveguide coupled to the coupler.

10. The structure of claim 9, wherein the material includes a silicon nitride material.

11. The structure of claim 9, wherein the coupler includes a polysilicon material.

12. The structure of claim 9, wherein the first side is a backside and the second side is a front side.

13. The structure of claim 9, wherein the light is received by the lens from an optical fiber.

\* \* \* \* \*